United States Patent

McDaniel et al.

(10) Patent No.: US 6,613,852 B2
(45) Date of Patent: Sep. 2, 2003

(54) ORGANOMETAL CATALYST COMPOSITIONS

(75) Inventors: Max P. McDaniel, Bartlesville, OK (US); Kathy S. Collins, Bartlesville, OK (US); Anthony P. Eaton, Dewey, OK (US); Elizabeth A. Benham, Bartlesville, OK (US); Michael D. Jensen, Bartlesville, OK (US); Joel L. Martin, Bartlesville, OK (US); Gil R. Hawley, Dewey, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 4 days.

(21) Appl. No.: 10/037,016

(22) Filed: Dec. 21, 2001

(65) Prior Publication Data

US 2002/0082365 A1 Jun. 27, 2002

Related U.S. Application Data (62) Division of application No. 09/401,354, filed on Sep. 27, 1999, now Pat. No. 6,355,594.

(51) Int. Cl.[7] .................................................. C08F 4/42
(52) U.S. Cl. .......................... 526/160; 526/64; 526/97; 526/114; 526/116; 526/128; 526/348; 526/943; 502/152; 502/36; 502/102; 502/103; 502/104; 502/117; 502/132; 502/134
(58) Field of Search .............................. 526/64, 97, 114, 526/116, 128, 160, 348, 943; 502/152, 36, 102, 103, 104, 117, 132, 134

(56) References Cited

U.S. PATENT DOCUMENTS

| | | |
|---|---|---|
| 5,171,798 A | 12/1992 | McDaniel et al. |
| 5,543,376 A | 8/1996 | Bergmeister ................ 502/117 |
| 5,703,181 A | 12/1997 | Tashiro et al. |
| 5,705,578 A | 1/1998 | Peifer et al. |
| 6,239,059 B1 | 5/2001 | Saudemont et al. |

FOREIGN PATENT DOCUMENTS

| | | |
|---|---|---|
| EP | 0 628 574 A1 | 12/1944 |
| EP | 0 416 928 A2 | 3/1991 |
| EP | 0 628 574 | 12/1994 |
| WO | WO 98/31463 | 7/1998 |
| WO | WO 99/02570 A1 | 1/1999 |

OTHER PUBLICATIONS

U.S. patent application Ser. No. 09/080,619, McDaniel et al.
International Search Report from International Appln. No. PCT/US00/26349.

Primary Examiner—David W. Wu
Assistant Examiner—Ling-Siu Choi
(74) Attorney, Agent, or Firm—Kilpatrick Stockton LLP (57) ABSTRACT

This invention provides catalyst compositions that are useful for polymerizing at least one monomer to produce a polymer. This invention also provides catalyst compositions that are useful for polymerizing at least one monomer to produce a polymer, wherein said catalyst composition comprises a post-contacted organometal compound, a post-contacted organoaluminum compound, and a post-contacted fluorided silica-alumina.

6 Claims, 2 Drawing Sheets

ORGANOMETAL CATALYST COMPOSITIONS

This application is a divisional of application Ser. No. 09/401,354, filed on Sep. 27, 1999, now U.S. Pat. No. 6,355,594.

FIELD OF THE INVENTION

This invention is related to the field of organometal catalyst compositions.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1960. However, their low productivity did not allow them to be commercialized. About 1975, it was discovered that contacting one part water with one part trimethylaluminum to form methyl aluminoxane, and then contacting such methyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Borate compounds have been used in place of large amounts of methyl aluminoxane. However, this is not satisfactory, since borate compounds are very sensitive to poisons and decomposition, and can also be very expensive.

It should also be noted that having a heterogeneous catalyst is important. This is because heterogeneous catalysts are required for most modem commercial polymerization processes. Furthermore, heterogeneous catalysts can lead to the formation of substantially uniform polymer particles that have a high bulk density. These types of substantially uniform particles are desirable because they improve the efficiency of polymer production and transportation. Efforts have been made to produce heterogeneous metallocene catalysts; however, these catalysts have not been entirely satisfactory.

Therefore, the inventors provide this invention to help solve these problems.

SUMMARY OF THE INVENTION

An object of this invention is to provide a process that produces a catalyst composition that can be used to polymerize at least one monomer to produce a polymer.

Another object of this invention is to provide the catalyst composition.

Another object of this invention is to provide a process comprising contacting at least one monomer and the catalyst composition under polymerization conditions to produce the polymer.

Another object of this invention is to provide an article that comprises the polymer produced with the catalyst composition of this invention.

In accordance with one embodiment of this invention, a process to produce a catalyst composition is provided. The process comprises (or optionally, "consists essentially of", or "consists of") contacting an organometal compound, an organoaluminum compound, and a fluorided silica-alumina to produce the catalyst composition, wherein said organometal compound has the following general formula:

$$(X^1)(X^2)(X^3)(X^4)M^1$$

wherein $M^1$ is selected from the group consisting of titanium, zirconium, and hafnium;

wherein $(X^1)$ is independently selected from the group consisting of cyclopentadienyls, indenyls, fluorenyls, substituted cyclopentadienyls, substituted indenyls, and substituted fluorenyls;

wherein substituents on the substituted cyclopentadienyls, substituted indenyls, and substituted fluorenyls of $(X^1)$ are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen;

wherein at least one substituent on $(X^1)$ can be a bridging group which connects $(X^1)$ and $(X^2)$;

wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein $(X^2)$ is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein substituents on $(X^2)$ are selected from the group consisting of aliphatic groups, cyclic groups, combinations of aliphatic groups and cyclic groups, silyl groups, alkyl halide groups, halides, organometallic groups, phosphorus groups, nitrogen groups, silicon, phosphorus, boron, germanium, and hydrogen;

wherein at least one substituent on $(X^2)$ can be a bridging group which connects $(X^1)$ and $(X^2)$;

wherein the organoaluminun compound has the following general formula:

$$Al(X^5)_n(X^6)_{3-n}$$

wherein $(X^5)$ is a hydrocarbyl having from 1 to about 20 carbon atoms;

wherein $(X^6)$ is a halide, hydride, or alkoxide; and wherein "n" is a number from 1 to 3 inclusive;

wherein the fluorided silica-alumina comprises fluoride, silica, and alumina.

In accordance with another embodiment of this invention, a process is provided comprising contacting at least one monomer and the catalyst composition under polymerization conditions to produce a polymer.

In accordance with another embodiment of this invention, an article is provided. The article comprises the polymer produced in accordance with this invention.

These objects, and other objects, will become more apparent to those with ordinary skill in the art after reading this disclosure.

BRIEF DESCRIPTION OF THE DRAWINGS

In the drawings, forming a part hereafter, FIG. 1 discloses a graph of the activity of the catalyst composition at various fluoride loadings and calcining temperatures.

DETAILED DESCRIPTION OF THE INVENTION

Organometal compounds used in this invention have the following general formula:

$$(X^1)(X^2)(X^3)(X^4)M^1$$

In this formula, $M^1$ is selected from the group consisting of titanium, zirconium, and hafnium. Currently, it is most preferred when $M^1$ is zirconium.

In this formula, $(X^1)$ is independently selected from the group consisting of (hereafter "Group OMC-I") cyclopentadienyls, indenyls, fluorenyls, substituted cyclopentadienyls, substituted indenyls, such as, for example, tetrahydroindenyls, and substituted fluorenyls, such as, for example, octahydrofluorenyls.

Substituents on the substituted cyclopentadienyls, substituted indenyls, and substituted fluorenyls of $(X^1)$ can be selected independently from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

In this formula, $(X^3)$ and $(X^4)$ are independently selected from the group consisting of (hereafter "Group OMC-II") halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to about 10 carbon atoms. However, it is most preferred when $(X^3)$ and $(X^4)$ are selected from the group consisting of fluoro, chloro, and methyl.

In this formula, $(X^2)$ can be selected from either Group OMC-I or Group OMC-II.

At least one substituent on $(X^1)$ or $(X^2)$ can be a bridging group that connects $(X^1)$ and $(X^2)$, as long as the bridging group does not substantially, and adversely, affect the activity of the catalyst composition. Suitable bridging groups include, but are not limited to, aliphatic groups, cyclic groups, combinations of aliphatic groups and cyclic groups, phosphorous groups, nitrogen groups, organometallic groups, silicon, phosphorus, boron, and germanium.

Suitable examples of aliphatic groups are hydrocarbyls, such as, for example, paraffins and olefins. Suitable examples of cyclic groups are cycloparaffins, cycloolefins, cycloacetylenes, and arenes. Suitable organometallic groups include, but are not limited to, substituted silyl derivatives, substituted tin groups, substituted germanium groups, and substituted boron groups.

Various processes are known to make these organometal compounds. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such organometal compounds are as follows:

bis(cyclopentadienyl)hafnium dichloride;

bis(cyclopentadienyl)zirconium dichloride;

1,2-ethanediylbis(η⁵-1-indenyl)di-n-butoxyhafnium;

1,2-ethanediylbis(η⁵-1-indenyl)dimethylzirconium;

3,3-pentanediylbis(η⁵-4,5,6,7-tetrahydro-1-indenyl)hafnium dichloride;

methylphenylsilylbis(η⁵-4,5,6,7-tetrahydro-1-indenyl)zirconium dichloride;

bis(η-butylcyclopentadienyl)bis(di-t-butylamido)hafnium;

bis(η-butylcyclopentadienyl)zirconium dichloride;

dimethylsilylbis(1-indenyl)zirconium dichloride;

nonylphenylsilylbis(1-indenyl)hafnium dichloride;

dimethylsilylbis(η⁵-4,5,6,7-tetrahydro-1-indenyl)zirconium dichloride;

dimethylsilylbis(2-methyl-1-indenyl)zirconium dichloride;

1,2-ethanediylbis(9-fluorenyl)zirconium dichloride;

indenyl diethoxy titanium(IV) chloride;

(isopropylamidodimethylsilyl)cyclopentadienyltitanium dichloride;

bis(pentamethylcyclopentadienyl)zirconium dichloride;

bis(indenyl)zirconium dichloride;

methyloctylsilyl bis(9-fluorenyl)zirconium dichloride;

and

-continued bis-[1-(N,N-diisopropylamino)boratabenzene]hydridozirconium trifluoromethylsulfonate

Preferably, said organometal compound is selected from the group consisting of bis(n-butylcyclopentadienyl)zirconium dichloride;

bis(indenyl)zirconium dichloride;

dimethylsilylbis(1-indenyl)zirconium dichloride;

and

-continued methyloctylsilylbis(9-fluorenyl)zirconium dichloride

Organoaluminum compounds have the following general formula:

$$Al(X^5)_n(X^6)_{3-n}$$

In this formula, $(X^5)$ is a hydrocarbyl having from 1 to about 20 carbon atoms. Currently, it is preferred when $(X^5)$ is an alkyl having from 1 to about 10 carbon atoms. However, it is most preferred when $(X^5)$ is selected from the group consisting of methyl, ethyl, propyl, butyl, and isobutyl.

In this formula, $(X^6)$ is a halide, hydride, or alkoxide. Currently, it is preferred when $(X^6)$ is independently selected from the group consisting of fluoro and chloro. However, it is most preferred when $(X^6)$ is chloro.

In this formula, "n" is a number from 1 to 3 inclusive. However, it is preferred when "n" is 3.

Examples of such compounds are as follows:
trimethylaluminum;
triethylaluminum (TEA);
tripropylaluminum;
diethylaluminum ethoxide;
tributylaluminum;
triisobutylaluminum hydride;
triisobutylaluminum; and
diethylaluminum chloride.
Currently, TEA is preferred.

The fluorided silica-alumina comprises silica, alumina and fluoride. The fluorided silica-alumina is in the form of a particulate solid. Generally, to produce the fluorided silica-alumina, a silica-alumina is treated with a fluoriding agent, in order to add fluoride to the silica-alumina. Generally, the fluoride is added to the silica-alumnina by forming a slurry of the silica-alumnina in a solution of the fluoriding agent and a suitable solvent such as alcohol or water. Particularly suitable are one to three carbon atom alcohols because of their volatility and low surface tension. A suitable amount of the solution is utilized to provide the desired concentration of fluoride on the silica-alumina after drying. Drying can be effected by any method known in the art. For example, said drying can be completed by suction filtration followed by evaporation, drying under vacuum, or by spray drying.

Any organic or inorganic fluoriding agent which can form a surface fluoride with a silica-alumina can be used in this invention. Suitable fluoriding agents include, but are not limited to, hydrofluoric acid (HF), ammonium fluoride ($NH_4F$), ammonium bifluoride ($NH_4HF_2$), ammonium fluoroborate ($NH_4BF_4$), ammonium silicofluoride (($NH_4)_2SiF_6$), ammonium fluorophosphate ($NH_4PF_6$), and mixtures thereof. The most preferred fluoriding agent is ammonium bifluoride, due to ease of use and availability. The amount of fluoride present before calcining is generally in the range of about 2 to about 50% by weight, preferably about 3 to about 25% by weight, and most preferably, 4 to 20% by weight, where the weight percents are based on the weight of the fluorided silica-alumina before calcining.

It is important that the fluorided silica-alumnina be calcined. The calcining can be conducted in any suitable ambient. Generally, the calcining is conducted in an ambient atmosphere, preferably a dry ambient atmosphere, at a temperature in the range of about 200° C. to about 900° C., and for a time in the range of about 1 minute to about 100 hours. Preferably, the fluorided silica-alumina is calcined at temperatures from about 300° C. to about 600° C. and a time in a range of about 1 hour to about 10 hours, most preferably, temperatures from 350° C. to 550° C. and a time in a range of 1 hours to 10 hours.

Optionally, the silica-alumina can be treated with a fluoriding agent during calcining. Any fluoriding agent capable of contacting the silica-alumina during the calcining step can be used. In addition to those fluoriding agents described previously, organic fluoriding agents of high volatility are especially useful. Organic fluoriding agents of high volatility can be selected from the group consisting of freons, perfluorohexane, perfluorobenzene, fluoromethane, trifluoroethanol, and mixtures thereof. Gaseous hydrogen fluoride or fluorine itself can be used. One convenient method of contacting the silica-alumina is to vaporize a fluoriding agent into a gas stream used to fluidize the silica-alumina during calcination.

The silica-alumina should have a pore volume greater than about 0.5 cc/g, preferably greater than about 0.8 cc/g, and most preferably, greater than 1.0 cc/g.

The silica-alumina should have a surface area greater than about 100 m$^2$/g, preferably greater than about 250 m$^2$/g, and most preferably greater than 350 m$^2$/g.

The silica-alumina of this invention can have an alumina content from about 5 to about 95%, preferably from about 8 to about 50%, and most preferably from 10% to 30% alumina by weight.

The catalyst compositions of this invention can be produced by contacting the organometal compound, the fluorided silica-alumina, and the organoaluminum compound, together. This contacting can occur in a variety of ways, such as, for example, blending. Furthermore, each of these compounds can be fed into a reactor separately, or various combinations of these compounds can be contacted together before being further contacted in the reactor, or all three compounds can be contacted together before being introduced into the reactor.

Currently, one method is to first contact an organometal compound and a fluorided silica-alumina together, for about 1 minute to about 24 hours, preferably, 1 minute to 1 hour, at a temperature from about 10° C. to about 200° C., preferably 15° C. to 80° C., to form a first mixture, and then contact this first mixture with an organoaluminum compound to form the catalyst composition.

Preferably, the organometal compound, the organoaluminum compound, and the fluorided silica-alumina are precontacted before injection into the reactor for about 1 minute to about 24 hours, preferably, 1 minute to 1 hour, at a temperature from about 10° C. to about 200° C., preferably 20° C. to 80° C., in order to obtain high activity.

A weight ratio of organoaluminum compound to the fluorided silica-alumina in the catalyst composition ranges from about 5:1 to about 1:1000, preferably, from about 3:1 to about 1:100, and most preferably, from 1:1 to 1:50.

A weight ratio of the fluorided silica-alumina to the organometal compound in the catalyst composition ranges from about 10,000:1 to about 1:1, preferably, from about 1000:1 to about 10:1, and most preferably, from about 250:1 to 20:1. These ratios are based on the amount of the components combined to give the catalyst composition.

After contacting, the catalyst composition comprises a post-contacted organometal compound, a post-contacted organoaluminum compound, and a post-contacted fluorided silica-alumina. It should be noted that the post-contacted fluorided silica-alumina is the majority, by weight, of the catalyst composition. Often times, specific components of a catalyst are not known, therefore, for this invention, the catalyst composition is described as comprising post-contacted compounds.

The catalyst composition of this invention has an activity greater than a catalyst composition that uses the same organometal compound, and the same organoaluminum compound, but uses alumina, silica, or silica-alumina that has not been impregnated with fluoride as shown in control examples 3–7. Furthermore, the catalyst composition of this invention has an activity greater than a catalyst composition that uses the same organometal compound, and the same organoaluminum compound, but uses a fluorided silica or a fluorided alumina as shown in control examples 9–10. This activity is measured under slurry polymerization conditions, using isobutane as the diluent, and with a polymerization temperature of about 50 to about 150° C., and an ethylene pressure of about 400 to about 800 psig. When comparing activities, polymerization runs should occur at the same polymerization conditions. The reactor should have substantially no indication of any wall scale, coating or other forms of fouling.

However, it is preferred if the activity is greater than about 1000 grams of polymer per gram of fluorided silica-alumina per hour, more preferably greater than about 2000, even more preferably greater than 5000, and most preferably greater than 8,000. This activity is measured under slurry polymerization conditions, using isobutane as the diluent, and with a polymerization temperature of 90° C., and an ethylene pressure of 550 psig. The reactor should have substantially no indication of any wall scale, coating or other forms of fouling.

One of the important aspects of this invention is that no aluminoxane needs to be used in order to form the catalyst composition. Aluminoxane is an expensive compound that greatly increases polymer production costs. This also means that no water is needed to help form such aluminoxanes. This is beneficial because water can sometimes kill a polymerization process. Additionally, it should be noted that no borate compounds need to be used in order to form the catalyst composition. In summary, this means that the catalyst composition, which is heterogeneous, and which can be used for polymerizing monomers or monomers and one or more comonomers, can be easily and inexpensively produced because of the absence of any aluminoxane compounds or borate compounds. Additionally, no organochromium compound needs to be added, nor any $MgCl_2$ needs to be added to form the invention. Although aluminoxane, borate compounds, organochromium compounds, or $MgCl_2$ are not needed in the preferred embodiments, these compounds can be used in other embodiments of this invention.

In another embodiment of this invention, a process comprising contacting at least one monomer and the catalyst composition to produce at least one polymer is provided. The term "polymer" as used in this disclosure includes homopolymers and copolymers. The catalyst composition can be used to polymerize at least one monomer to produce a homopolymer or a copolymer. Usually, homopolymers are comprised of monomer residues, having 2 to about 20 carbon atoms per molecule, preferably 2 to about 10 carbon atoms per molecule. Currently, it is preferred when at least one monomer is selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

When a homopolymer is desired, it is most preferred to polymerize ethylene or propylene. When a copolymer is desired, the copolymer comprises monomer residues and one or more comonomer residues, each having from about 2 to about 20 carbon atoms per molecule. Suitable comonomers include, but are not limited to, aliphatic 1-olefins having from 3 to 20 carbon atoms per molecule, such as, for example, propylene, 1-butene, 1-pentene, 4-methyl-1-pentene, 1-hexene, 1-octene, and other olefins and conjugated or nonconjugated diolefins such as 1,3-butadiene, isoprene, piperylene, 2,3-dimethyl-1,3-butadiene, 1,4-pentadiene, 1,7-hexadiene, and other such diolefins and mixtures thereof. When a copolymer is desired, it is preferred to polymerize ethylene and at least one comonomer selected from the group consisting of 1-butene, 1-pentene, 1-hexene, 1-octene, and 1-decene. The amount of comonomer introduced into a reactor zone to produce a copolymer is generally from about 0.01 to about 10 weight percent comonomer based on the total weight of the monomer and comonomer, preferably, about 0.01 to about 5, and most preferably, 0.1 to 4. Alternatively, an amount sufficient to give the above described concentrations, by weight, in the copolymer produced can be used.

Processes that can polymerize at least one monomer to produce a polymer are known in the art, such as, for example, slurry polymerization, gas phase polymerization, and solution polymerization. It is preferred to perform a slurry polymerization in a loop reaction zone. Suitable diluents used in slurry polymerization are well known in the art and include hydrocarbons which are liquid under reaction conditions. The term "diluent" as used in this disclosure does not necessarily mean an inert material; it is possible that a diluent can contribute to polymerization. Suitable hydrocarbons include, but are not limited to, cyclohexane, isobutane, n-butane, propane, n-pentane, isopentane, neopentane, and n-hexane. Furthermore, it is most preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

The catalyst compositions used in this process produce good quality polymer particles without substantially fouling the reactor. When the catalyst composition is to be used in a loop reactor zone under slurry polymerization conditions, it is preferred when the particle size of the solid oxide compound is in the range of about 10 to about 1000 microns, preferably about 25 to about 500 microns, and most preferably, 50 to 200 microns, for best control during polymerization.

In a more specific embodiment of this invention, a process is provided to produce a catalyst composition, the process comprising (optionally, "consisting essentially of", or "consisting of"):

(1) contacting a silica-alumina with water containing ammonium bifluoride to produce a fluorided silica-alumina;

(2) calcining the fluorided silica-alumina at a temperature within a range of 350 to 550° C. to produce a calcined composition having 4 to 20 weight percent fluoride based on the weight of the fluorided silica-alumina before calcining;

(3) combining said calcined composition and bis(n-butylcyclopentadienyl) zirconium dichloride at a temperature within the range of 15° C. to 80° C. to produce a mixture; and (4) after between 1 minute and 1 hour, combining said mixture and triethylaluminum to produce said catalyst composition.

Hydrogen can be used in this invention in a polymerization process to control polymer molecular weight.

After the polymers are produced, they can be formed into various articles, such as, for example, household containers and utensils, film products, drums, fuel tanks, pipes, geomembranes, and liners. Various processes can form these articles. Usually, additives and modifiers are added to the polymer in order to provide desired effects. It is believed that by using the invention described herein, articles can be produced at a lower cost, while maintaining most, if not all, of the unique properties of polymers produced with metallocene catalysts.

EXAMPLES

Testing Methods

A "Quantachrome Autosorb-6 Nitrogen Pore Size Distribution Instrument" was used to determined surface areas and pore volumes. This instrument was acquired from the Quantachrome Corporation, Syosset, N.Y.

Preparation of Oxide Compounds for Control

Examples 3–7

Silica was obtained from W. R. Grace, grade 952, having a pore volume of 1.6 cubic centimeter per gram (cc/g) and a surface area of about 300 square meters per gram ($m^2/g$).

About 10 grams of the silica were placed in a 1.75 inch quartz tube fitted with a sintered quartz disk at the bottom. While the silica was supported on the disk, dry air was blown up through the disk at the linear rate of about 1.6 to 1.8 standard cubic feet per hour. An electric furnace around the quartz tube was then turned on, and the temperature was raised at the rate of 400° C. per hour to a temperature of 600° C. At this temperature, the silica was allowed to fluidize for three hours in the dry air. Afterward, the silica was collected and stored under dry nitrogen. The silica did not have any exposure to the atmosphere.

Alumina sold as Ketjen grade B alumina from Akzo Nobel was obtained having a pore volume of about 1.78 cc/g and a surface area of about 340 $m^2/g$. Alumina samples were prepared by the procedure described previously for the silica except the alumina samples were calcined at 400° C., 600° C., and 800° C.

A silica-alumina was obtained from W. R. Grace as MS 13-110 containing 13% alumina and 87% silica. The silica-alumina had a pore volume of 1.2 cc/g and a surface area of about 400 $m^2/g$. Silica-alumina samples were prepared as described previously for the silica.

General Description of Polymerizations Runs

Polymerization runs were made in a 2.2 liter steel reactor equipped with a marine stirrer running at 400 revolutions per minute (rpm). The reactor was surrounded by a steel jacket containing boiling methanol with a connection to a steel condenser. The boiling point of the methanol was controlled by varying nitrogen pressure applied to the condenser and jacket, which permitted precise temperature control to within ±0.5° C., with the help of electronic control instruments.

Unless otherwise stated, first, an oxide compound or fluorided silica-alumina was charged under nitrogen to a dry reactor. Next, two milliliters of a solution containing 0.5 grams of bis(n-butylcyclopentadienyl) zirconium dichloride per 100 milliliters of toluene were added by syringe. Then, 1.2 liters of isobutane were charged to the reactor, and the reactor was then heated up to 90° C. One milliliter, or two milliliters, of TEA or ethyl aluminum dichloride (EADC) was added midway during the isobutane addition. Finally, ethylene was added to the reactor to equal 550 psig, which was maintained during the experiment. The stirring was allowed to continue for the specified time, and the activity was noted by recording the flow of ethylene into the reactor to maintain pressure.

After the allotted time, the ethylene flow was stopped, and the reactor slowly depressurized and opened to recover a granular polymer. In all cases, the reactor was clean with no indication of any wall scale, coating, or other forms of fouling. The polymer was then removed, dried, and weighed.

Examples 1–2
(Controls)

This example demonstrates that an organometal compound added to the reactor with TEA or EADC does not provide any activity.

A polymerization run was made as described previously except no oxide compound was added. Ethylene was added, but no activity was seen. After one hour of stirring, the reactor was depressurized and opened, but in each case no polymer was found. These results are shown in Table 1.

Examples 3–7
(Controls)

This experiment demonstrates the use of different oxide compounds, an organometal compound, and TEA.

Each of the oxide compounds described previously was added to the reactor, followed by the organometal compound and TEA solutions as used in the procedure discussed previously. These runs are shown in Table 1.

Silica produced almost no polymer. Alumina, which is regarded as more acidic than the silica, produced more polymer, but still the activity was very low. This was true of all three different activation temperatures tested. The silica-alumina also exhibited only very low activity.

Example 8
(Control and Inventive Runs)

The following catalyst compositions were produced to demonstrate this invention at different loadings of ammonium bifluoride and at different calcination temperatures.

A small amount of a silica-alumina, sold as MS13-110 by W. R. Grace Company having a surface area of 400 m$^2$/g and a pore volume of 1.2 cc/g, was impregnated with about twice its weight of water containing ammonium bifluoride dissolved in it to produce a fluorided silica-alumina. For example, fifty grams of the silica-alumina was impregnated with 100 milliliters of an aqueous solution containing 5 grams of ammonium bifluoride for a 10 weight percent loading of ammonium bifluoride. This resulted in a wet sand consistency.

The fluorided silica-alumina was then placed in a vacuum oven and dried overnight at 110° C. under half an atmosphere of vacuum. The final step was to calcine 10 grams of the fluorided silica-alumina in dry fluidizing air at the required temperature for three hours. The fluorided silica-alumina was then stored under nitrogen until a small quantity was charged to the reactor with an organometal compound and TEA as described previously in this disclosure.

Figure 1:
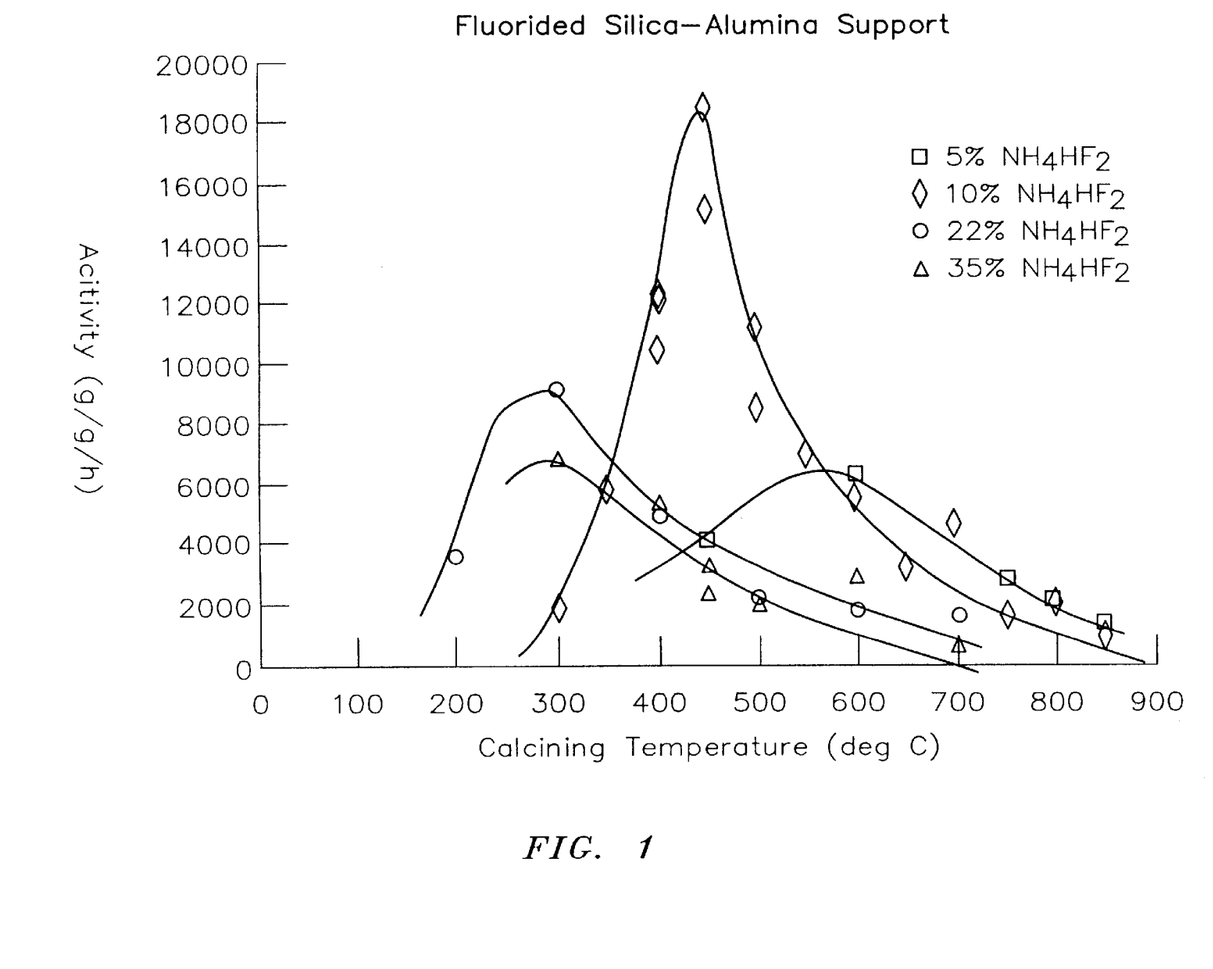
Figure 2:
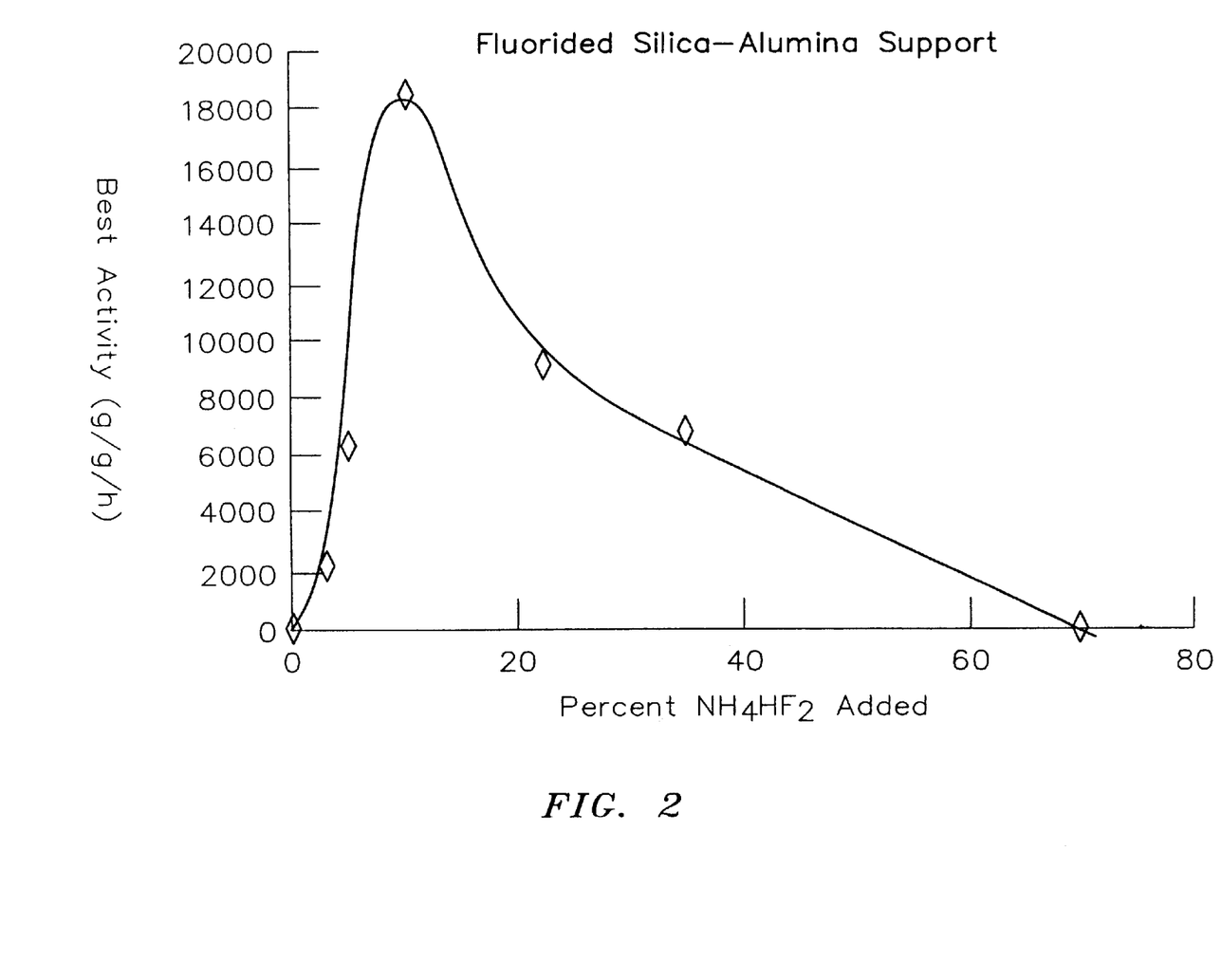
FIG. 2 discloses a graph of the activity versus percent $NH_4HF_2$ added.

These runs are shown in Table 2, and they are plotted graphically in FIG. 1. Table 3 shows the most active run from each loading, regardless of its calcining temperature plotted against ammonium bifluoride loading. These results are plotted graphically in FIG. 2.

As can be seen from the data in Table 3, excellent catalyst activity was observed when the ammonium bifluoride loading was from about 5 to about 35% by weight with a calcining temperature of from about 300° C. to about 600° C.

TABLE 2

| Example | NH$_4$HF$_2$ Loading (wt. %) | Fluorided Silica-Alumina (g) | Polymer (g) | Time (min) | Calcining (° C.) | Activity* |
|---|---|---|---|---|---|---|
| 8-1 | 5 | 0.0293 | 140 | 69.0 | 450 | 4155 |
| 8-2 | 5 | 0.0188 | 117 | 60.1 | 600 | 6213 |
| 8-3 | 5 | 0.0353 | 60 | 37.0 | 750 | 2756 |
| 8-4 | 5 | 0.2318 | 203 | 40.0 | 850 | 1312 |
| 8-5 | 3 | 0.1266 | 205 | 45.7 | 800 | 2126 |
| 8-6 | 10 | 0.0800 | 68 | 28.0 | 300 | 1816 |
| 8-7 | 10 | 0.0248 | 163 | 67.7 | 350 | 5825 |
| 8-8 | 10 | 0.0251 | 228 | 44.5 | 400 | 12248 |
| 8-9 | 10 | 0.0183 | 175 | 48.0 | 400 | 11954 |
| 8-10 | 10 | 0.0779 | 270 | 20.0 | 400 | 10398 |
| 8-11 | 10 | 0.0109 | 165 | 60.0 | 450 | 15138 |

TABLE 1

(Control Runs 1–7)

| Example | Type of Oxide Compound | Calcining (° C.) | Oxide Compound (g) | Organo-aluminum Compound (ml) | Polymer (g) | Run Time (min.) | Activity* |
|---|---|---|---|---|---|---|---|
| 1 | None | | 0.0000 | 2 (TEA) | 0 | 61.1 | 0 |
| 2 | None | | 0.0000 | 2 (EADC) | 0 | 28.0 | 0 |
| 3 | Silica | 600 | 0.5686 | 2 (TEA) | 0.65 | 63.0 | 1 |
| 4 | Alumina | 800 | 0.6948 | 1 (TEA) | 2.7 | 30.7 | 8 |
| 5 | Alumina | 600 | 0.2361 | 2 (TEA) | 6.9 | 60.9 | 29 |
| 6 | Alumina | 400 | 0.8475 | 1 (TEA) | trace | 57.2 | 0 |
| 7 | Silica-Alumina | 600 | 0.3912 | 1 (TEA) | 8.3 | 40.0 | 32 |

*Activity is in units of grams of polymer/gram of oxide compound charged per hour.

TABLE 2-continued

| Example | NH$_4$HF$_2$ Loading (wt. %) | Fluorided Silica-Alumina (g) | Polymer (g) | Time (min) | Calcining (° C.) | Activity* |
|---|---|---|---|---|---|---|
| 8-12 | 10 | 0.0059 | 109 | 60.0 | 450 | 18475 |
| 8-13 | 10 | 0.0200 | 224 | 60.1 | 500 | 11181 |
| 8-14 | 10 | 0.0792 | 179 | 16.0 | 500 | 8485 |
| 8-15 | 10 | 0.0249 | 175 | 60.0 | 550 | 7028 |
| 8-16 | 10 | 0.0897 | 149 | 18.0 | 600 | 5537 |
| 8-17 | 10 | 0.0346 | 113 | 60.2 | 650 | 3255 |
| 8-18 | 10 | 0.0908 | 149 | 21.0 | 700 | 4688 |
| 8-19 | 10 | 0.2336 | 288 | 50.0 | 750 | 1478 |
| 8-20 | 10 | 0.0829 | 91 | 32.0 | 800 | 2057 |
| 8-21 | 10 | 0.2185 | 183 | 55.0 | 850 | 916 |
| 8-22 | 22 | 0.1773 | 319 | 30.0 | 200 | 3598 |
| 8-23 | 22 | 0.2355 | 320 | 9.0 | 300 | 9068 |
| 8-24 | 22 | 0.1456 | 250 | 21.0 | 400 | 4896 |
| 8-25 | 22 | 0.0214 | 34 | 45.2 | 500 | 2109 |
| 8-26 | 22 | 0.1715 | 146 | 31.0 | 600 | 1651 |
| 8-27 | 22 | 0.1624 | 88 | 22.0 | 700 | 1474 |
| 8-28 | 35 | 0.2944 | 336 | 10.0 | 300 | 6854 |
| 8-29 | 35 | 0.0786 | 108 | 15.0 | 400 | 5471 |
| 8-30 | 35 | 0.0725 | 160 | 39.0 | 450 | 2410 |
| 8-31 | 35 | 0.0191 | 55 | 71.7 | 450 | 3395 |
| 8-32 | 35 | 0.0832 | 58 | 20.0 | 500 | 2091 |
| 8-33 | 35 | 0.1021 | 127 | 25.0 | 600 | 2989 |
| 8-34 | 35 | 0.0715 | 21 | 26.0 | 700 | 689 |
| 8-35 | 70 | 0.0175 | 0 | 92.3 | 450 | 0 |
| 8-36 | 70 | 0.0446 | 0 | 40.0 | 450 | 0 |

*Activity is in units of grams of polymer/gram of fluorided silica-alumina charged per hour.

TABLE 3

| Example | NH$_4$HF$_2$ Loading (wt. %) | Fluorided Silica-Alumina (g) | Polymer (g) | Run Time (min) | Calcining (° C.) | Activity* |
|---|---|---|---|---|---|---|
| 7 | 0 | 0.3912 | 8.3 | 40.0 | 600 | 32 |
| 8-5 | 3 | 0.1266 | 205 | 45.7 | 800 | 2126 |
| 8-2 | 5 | 0.0188 | 117 | 60.1 | 600 | 6213 |
| 8-11 | 10 | 0.0059 | 109 | 60.0 | 450 | 18475 |
| 8-23 | 22 | 0.2355 | 320 | 9.0 | 300 | 9068 |
| 8-28 | 35 | 0.2944 | 336 | 10.0 | 300 | 6854 |
| 8-35 | 70 | 0.0175 | 0 | 92.3 | 450 | 0 |

*Activity is in units of grams of polymer/gram of fluorided silica-alumina charged per hour.

Example 9

(Control)

The procedure of example 8 was repeated, except that instead of a silica-alumina, a silica was used instead.

A grade 952 silica obtained from W. R. Grace was impregnated with 10% ammonium bifluoride as described previously in this disclosure to produce a fluorided silica. The silica has a surface area of about 300 m²/g and a pore volume of about 1.6 cc/g. The fluorided silica was then calcined at 450° C. for three hours in dry air and tested for polymerization activity. It exhibited no activity at all.

Example 10

(Control)

The procedure of example 8 was repeated, except that instead of silica-alumina, an alumina was used instead.

An alumina called Ketjen grade B obtained from Akzo Nobel was impregnated with various loadings of ammonium bifluoride to produce a fluorided alumina as described previously. The alumina has a surface area of about 400 m²/g and a pore volume of about 1.6 cc/g. The fluorided alumina samples were then calcined at 450° C. or 500° C. for three hours in dry air and tested for polymerization activity as described previously in this disclosure. These results are shown in Table 4. The activity of the fluorided alumina samples is considerably below the activity shown in the inventive runs using a fluorided silica-alumina.

TABLE 4

| Example | NH$_4$HF$_2$ Loading (wt. %) | Fluorided Alumina (g) | Polymer (g) | Run Time (min) | Calcining (° C.) | Activity* |
|---|---|---|---|---|---|---|
| 10-1 | 10 | 0.1086 | 17.6 | 40.0 | 500 | 243 |
| 10-2 | 15 | 0.2563 | 243.9 | 60.0 | 500 | 952 |
| 10-3 | 25 | 02542 | 164 | 55.0 | 450 | 704 |
| 10-4 | 35 | 0.1157 | 37 | 30.0 | 500 | 640 |

*Activity is in units of grams of polymer/gram of fluorided alumina charged per hour.

While this invention has been described in detail for the purpose of illustration, it is not intended to be limited thereby but is intended to cover all changes and modifications within the spirit and scope thereof.

That which is claimed is:

1. A polymerization process comprising contacting at least one monomer and a catalyst composition under polymerization conditions to produce a polymer;

wherein said catalyst composition is produced by a process comprising contacting at least one organometal compound, and at least one organoaluminum compound, and at least one fluorided silica-alumina to produce said catalyst composition, wherein said organometal compound has the following general formula:

$(X^1)(X^2)(X^3)(X^4)M^1$ wherein $M^1$ is selected from the group consisting of titanium, zirconium, and hafnium;

wherein $(X^1)$ is independently selected from the group consisting of cyclopentadienyls, indenyls, fluorenyls, substituted cyclopentadienyls, substituted indenyls, and substituted fluorenyls;

wherein substitutents on said substituted cyclopentadienyls, substituted indenyls, and substituted fluorenyls of $(X^1)$ are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, and germanium;

wherein at least one substituent on $(X^1)$ can be a bridging group which connects $(X^1)$ and $(X^2)$;

wherein $(X^3)$ and $(X^4)$ are independently selected from the group consisting of halides, aliphatic groups substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted pphosphido groups, alkylox- ide groups, substituted alkyloxide groups, aryloxide groups, substituted aryloxide groups, organometallic groups, and substituted organometallic groups;

wherein ($X^2$) is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and Substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein substitutents on ($X^2$) are selected from the group consisting of aliphatic groups, cyclic groups, combinations of aliphatic groups and cyclic groups, silyl groups, alkyl halide groups, halides, organometallic groups, phosphorus groups, nitrogen groups, silicon, phosphorus, boron, and germanium;

wherein at least one substitutent on ($X^2$) can be a bridging group which connects ($X^1$) and ($X^2$);

wherein said organoaluminum compound has the general formula:

wherein ($X^5$) is a hydrocarbyl having from 1 to about 20 carbon atoms;

wherein ($X^6$) is a halide, hydride, or alkoxide; and wherein "n" is a number from 1 to 3 inclusive; and wherein said fluorided silica-alumina comprises fluoride, silica, and alumina; and wherein there is a absence of organoborates and aluminoxanes.

2. A process according to claim 1 wherein said polymerization conditions comprise slurry polymerization conditions.

3. A process according to claim 2 wherein said contacting is conducted in a loop reaction zone.

4. A process according to claim 3 wherein said contacting is conducted in the presence of a diluent that comprises, in major part, isobutane.

5. A process according to claim 1 wherein at least one monomer is ethylene.

6. A process according to claim 1 wherein at least one monomer comprises ethylene and an aliphatic 1-olefin having 3 to 20 carbon atoms per molecule.

* * * * *